United States Patent [19]

Sousek

[11] 4,409,740
[45] Oct. 18, 1983

[54] YELLOWCAKE ($U_3O_8$) DUST, WATER AND HEAT RECOVERY PROCESS AND APPARATUS

[75] Inventor: Dennis D. Sousek, Littleton, Colo.
[73] Assignee: Dravo Corporation, Pittsburgh, Pa.
[21] Appl. No.: 316,558
[22] Filed: Oct. 30, 1981
[51] Int. Cl.³ ............................................. F26B 5/00
[52] U.S. Cl. ............................................ 34/11; 34/32; 34/79
[58] Field of Search ............. 55/228, 229, 85, 89; 34/26, 27, 32, 79, 75, 77, 11, 102

[56] References Cited

U.S. PATENT DOCUMENTS

| | | | |
|---|---|---|---|
| 2,142,406 | 1/1939 | Nonhebel et al. | 55/228 |
| 3,134,651 | 5/1964 | Bice | 55/85 |
| 3,315,443 | 4/1967 | Marino | 55/228 |
| 4,375,450 | 3/1983 | Katagiri et al. | 55/228 |

Primary Examiner—Larry I. Schwartz
Attorney, Agent, or Firm—Parmelee, Miller, Welsh & Kratz

[57] ABSTRACT

A process and apparatus for the essentially complete recovery of heat, process fluid and yellowcake ($U_3O_8$) dust particles normally lost during the drying of yellowcake slurry. The off-gases, consisting of noncondensable gases vaporized fluid, and entrained yellowcake particles, produced in a yellowcake slurry dryer are directed into a condenser in which the off-gases are cooled and condensed by fluid sprays, preferably water. The condensate spent spray fluid and entrained yellowcake particles are collected in the condenser sump. A stream of the condensate and yellowcake particles from the sump is directed into a thickener for the recovery of the yellowcake in the underflow therein and its eventual recombination with the yellowcake slurry being fed to the dryer. A second stream of the spent spray is circulated to the fluid sprays while a third stream is cross-circulated into a bleed chamber. The noncondensable gases and any escaped vaporizable fluid are drawn by a suction means into the bleed chamber wherein any residual yellowcake particles contained in the gases and the escaped vaporized fluid are recovered. The cleaned noncondensable gases are discharged from the bleed chamber into a lixiviant tank containing process fluid and then vented to atmosphere. The heat absorbed by the spray fluid is recovered via an R-11 refrigerant filled heat transfer panel mounted in the condenser. The heat transferred into the panels is rejected from the condenser by use of known heat exchanging means. During operation no external sources of makeup process fluid are required for the operation of the condenser or bleed chamber.

36 Claims, 4 Drawing Figures

YELLOWCAKE (U₃O₈) DUST, WATER AND HEAT RECOVERY PROCESS AND APPARATUS

FIELD OF THE INVENTION

The invention relates to a process and apparatus for the recovery of yellowcake dust, water and heat which is normally lost during the drying of a yellowcake slurry. The recovered heat and water may be reused in the yellowcake production process or elsewhere as needs dictate. A portion of the recovered water is reused in the recovery process while the recovered yellowcake dust is recombined with the yellowcake slurry to be dried.

BACKGROUND

The final stage in the production of yellowcake ($U_3O_8$) involves the removal of water from a yellowcake slurry. Two methods of drying have been used to accomplish this removal. One method consists of a direct-fired system wherein the yellowcake slurry is fed into a dryer and subsequently comes in contact with the combustion products of the gas. The high temperature and mass flow of the combustion gases vaporize the water and remove it from the slurry. The steam and combustion gases which result from this process are exhausted to the atmosphere through air pollution control equipment. With this method, some of the yellowcake dust entrained in the steam and combustion gases is recovered but not the heat. The other drying method utilized is an indirect-fired system. There, hot oil (600° F.) is circulated through the walls of a vessel containing the slurry. The heat is transferred from the vessel into the slurry vaporizing the water contained therein. This approach produces a cleaner off-gas consisting of 98 percent steam and 2 percent noncondensables, e.g., Cl, $SO_x$, and entrained yellowcake dust. Again the gases are cleaned with air pollution control equipment. Both of these drying methods typically employ either a venturi type scrubber or a baghouse for cleaning the off-gases produced in the dryer.

Although scrubbers or baghouses are capable of recovering 98 percent of the yellowcake entrained in the off-gases, they are subject to the following problems and disadvantages. Both generate emissions which necessitate obtaining state and federal permits. Although operating at 98 percent efficiency, either type still loses considerable amounts of yellowcake—in the neighborhood of ten thousand pounds annually for a process producing yellowcake at a rate of three million pounds annually. Because of problems such as line plug-ups or blinding filter bags, these systems require constant maintenance resulting in costly production process downtime. The high negative pressure (12 to 35 inches W.G.) fans used with these systems produce more air infiltration into the dryer than is desired, thereby increasing dryer inefficiencies. In addition, control of the dryer draft produced by these fans is difficult to achieve in off-gases laden with water and dust. The controls and dampers become caked up and are quickly rendered inoperable, resulting in drawing too much air through the dryer which causes loss of additional yellowcake product by entrainment. Baghouses and scrubbers do not have any provisions or effect any conditions which make heat recovery convenient because of the contamination of their effluent with yellowcake dust. Scrubbers also add water to the process during recovery of yellowcake dust particles. This radioactive water must be removed elsewhere in the process at additional expense. Because high energy scrubbers (venturi type) are required to achieve 98 percent efficiency, more horsepower is necessary for their operation, thus increasing capital and operating costs.

In venturi-type scrubber systems used for the recovery of yellowcake particles, the off-gases produced in the dryer are drawn into the scrubber for cleaning. The spent yellowcake-containing spray from the scrubber is collected in a sump and is recirculated to the scrubber. A portion of the sump water recirculated is bled off into a thickener to permit recovery of the yellowcake particles contained therein. Because some water is lost to the atmosphere through evaporation, makeup water is added to the sump in order to replace this lost water and to prevent the concentration of yellowcake particles in the sump from exceeding 3 percent solids. Higher concentrations of yellowcake particles decrease the efficiency of the scrubber. In a typical system, the volume of off-gases produced in the dryer is usually too low to be effectively cleaned in the venturi scrubber. Accordingly, ambient air is combined with the off-gases to increase the volume of air and off-gases to a level suitable for cleaning. For example, in a yellowcake dryer having a slurry feed rate of about 1480 lbs./hr., approximately 740 lbs./hr. of off-gases and steam are produced. These gases along with air, which infiltrates the dryer at a rate of 225 SCFM, exit the dryer at a total flow rate of about 551 SCFM at 392° F. Approximately 509 SCFM of ambient air is added to this amount in order to have a flow rate of 1060 SCFM through the scrubber—the total volumetric rate required for effective cleaning of the off-gases.

For the scrubber process as described, the amount of losses are about one million Btu/h of heat energy and 2½ lbs./hr. of yellowcake when the yellowcake process is producing at a capacity of about 740 lbs./hr. of dried yellowcake. In addition, approximately 31 horsepower is consumed by this system, whereas in one embodiment of the present invention only 15 horsepower is consumed.

Although the above process deals with the recovery of yellowcake, this process does not address itself to the trifold recovery of heat, process fluid, and process product which would otherwise be lost.

SUMMARY OF THE INVENTION

The invention is a process for the essentially complete recovery of yellowcake dust, yellowcake process water, and yellowcake dryer heat without the need for air pollution control equipment or the use of additional makeup water while achieving a substantial reduction in the horsepower required to operate the process. The heated off-gases, a mixture of condensable and noncondensable gases and entrained yellowcake dust, produced in a yellowcake dryer during the removal of an evaporable fluid from a yellowcake slurry, are directed through a horizontally oriented row of baffles and into a condenser. There the off-gases come into direct contact with a fluid (water) spray which condenses the condensable gases (steam and water vapor). Fluid (water) sprays are positioned throughout the condenser to eliminate any stratified areas of off-gases such as in the corners, thereby increasing the condensation efficiency of the condenser. A portion of these fluid sprays is positioned such that the spent spray fluid impinges upon a vertically positioned heat transfer panel which is filled with a vaporizable fluid such as R-11 liquid refrigerant. The heat transfer panel absorbs the heat previously absorbed by the spent spray fluid, thus cooling the spray fluid which also contains the (water) condensate and entrained yellowcake dust particles. The spray impingement upon the heat transfer panel is sufficient to keep the vertical surfaces clean of any buildup of material. The heat absorbed by the heat transfer panel is then rejected from the condenser via the circulation of the R-11 refrigerant through a conventional heat exchanging means such as an air-cooled condenser, an air-cooled condenser mounted in a heating ventilating air conditioning (HVAC) air handler, or a water-cooled condenser. With the first alternative the recovered heat is released to the ambient atmosphere. The second and third alternatives provide for the reuse of the recovered heat energy for general heating purposes or the production process.

All of the spent spray (water) fluid is collected in the condenser sump. There, the spent spray fluid which does not impinge upon the heat transfer panel mixes with the spent spray coming off the panel to form what is defined as cooled spent spray fluid. A first stream of this fluid is cross-circulated between the condenser sump and a bleed chamber, preferably by the use of a single duo-housing pump. A duo-housing pump is a single pump having two impellers which allow for the simultaneous circulation of fluid in opposite directions. The rate of cross-circulation is such that the level of fluid in the bleed chamber remains essentially constant. A second stream is recirculated from the sump for use in spraying the incoming off-gas. A third stream is discharged into a thickener for the recovery of the yellowcake particles by its eventual recombination with the yellowcake slurry feed. The rate of discharge to the thickener is controlled so that it is equal to the rate of condensation of the incoming off-gases.

The noncondensable gases and any escaped condensable (water) gases are drawn by a suction means into the bleed chamber and through the circulating cooled spent spray liquid in order to recover any residual yellowcake particles entrained therewith and to condense the escaped condensable gases. The cleaned noncondensable gases are then exhausted to a lixiviant tank containing process fluid or to some other form of waste disposal pump. The suction means, preferably a rotary positive displacement blower, used to draw the gases from the condenser and into the bleed chamber also draws a slight negative pressure on the condenser. This allows only a small controlled amount of air infiltration into the dryer, thereby helping to improve the dryer efficiency.

The noncondensable gas and escaped gases are introduced into the bleed chamber via a vertically positioned perforated standpipe located at the center thereof which is partially immersed in the cooled spent spray liquid contained therein. This liquid is tangentially discharged into the bleed chamber so as to create a swirling vortex which keeps the entering gases about the standpipe. This arrangement prevents the gases from being recirculated back into the condenser sump via the fluid being withdrawn from the bleed chamber for cross-circulation.

It is therefore an object of this invention to recover the process heat and water and yellowcake particles which are normally lost by methods utilizing scrubbers or baghouses while using less horsepower than the prior art method.

Another object of this invention is to provide a yellowcake recovery system which does not add any additional fluid to the yellowcake process, but instead uses the fluids contained in the dryer off-gases to effect this recovery.

A further object is to provide a process which does not lose fluid from the process through evaporation and which utilizes a natural evolution of the product process, i.e., condensation, as a vehicle for the recovery of process heat.

A still further object is to provide a system which is simplified in construction and more economical to operate than those previously used for recovery of yellowcake.

Other objects, features and advantages of the invention will become apparent upon reading the following specification when taken in conjunction with the accompanying drawings.

DETAILED DESCRIPTION

Figure 1:
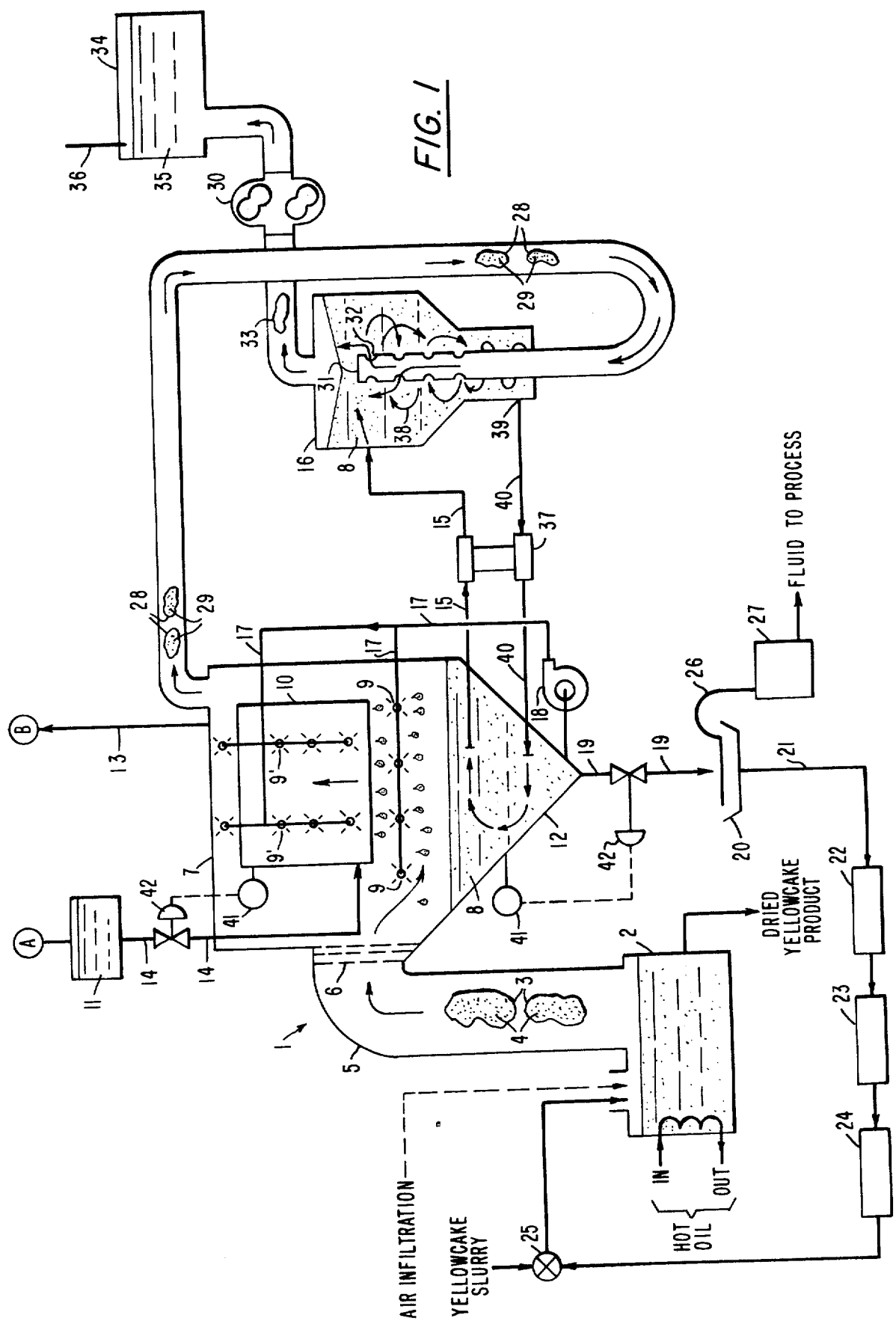
FIG. 1 is a schematic diagram of the yellowcake dust, water and heat recovery system in accordance with the invention.

In a process as shown in FIG. 1 for the essentially complete recovery of process heat, process fluid (water) and yellowcake dust, a yellowcake slurry, consisting of an evaporable fluid (water) and yellowcake, is indirectly heated in a yellowcake dryer 2 to form a substantially dry yellowcake product and off-gases 3. The off-gases 3 are a mixture of condensable (water) and noncondensable gases and entrained yellowcake particles 4. The condensable gases result from the vaporization of the evaporable fluid in the dryer 2. The off-gases 3 are drawn off the dryer 2 into a vertical duct 5, which is positioned over the dryer 2, and then horizontally and transversely through a plurality of baffles 6 into a condenser 7. The baffles 6 are used to thermally isolate the condenser 7 from the dryer 2 and duct 5 by interrupting any thermal radiation cooling which may tend to cool the duct 5 and cause condensation to occur therein, resulting in fluid dripping back into the dryer 2. The baffles 6 ensure that condensation occurs only in the condenser 7. As the off-gases 3 enter the condenser 7, they are contacted by a fluid 8 sprayed from a plurality of nozzles 9, 9'. The condensable gases contained in the off-gases 3 are condensed by their direct contact with the sprayed fluid 8. The nozzles 9 are positioned throughout the interior of the condenser 7 to completely fill the interior volume thereof with sprayed fluid 8 to prevent any stratification or pockets of uncondensed condensable gases. Some nozzles 9' of the nozzles 9 are positioned so that the sprayed fluid 8, after contacting the off-gases 3, impinges upon a specific vertical surface area of a vertically positioned heat transfer panel 10. Preferably, all exterior surfaces of the heat transfer panel 10 are sprayed. As indicated in FIG. 1, the off-gases 3 are preferably directed by the baffles 6 toward the bottom edge of the heat transfer panel 10 and then drawn upwardly through the spray nozzles 9' and over the vertical surfaces of the heat transfer panel 10 prior to exiting the condenser 7.

The panel 10 is filled with a readily vaporizable cooling fluid 11, preferably R-11 liquid refrigerant. As the sprayed fluid 8 flows over the surface of the panel 10, the heat absorbed by the spent spray fluid 8 from the off-gases 3 is transferred through the panel 10. This vaporizes the cooling fluid 11 contained therein and cools the spent spray fluid 8. Because of the impingement and flowing of the spent spray fluid 8 on the panel 10, the heat transfer surfaces are kept clean of any buildup of material which could decrease heat transfer efficiencies. The cooled spent spray fluid 8 which now contains the condensate from the off-gases 3 and entrained yellowcake particles 4 is collected in the condenser sump 12. The vaporized cooling fluid is continually circulated through a conventional heat exchanging means in which it is cooled and condensed and returned by gravity to the heat transfer panel 10 via lines 13 and 14, respectively. The heat exchanging means 200, 300, or 400, shown in FIGS. 2, 3, and 4, would be connected to lines 13 and 14 at the match points A and B and be used to recover the heat.

After collecting in the condenser sump 12, the cooled spent spray fluid 8 is separated into three streams. The first stream 15 is discharged into a bleed chamber 16. The second stream 17 is recirculated by a pump 18 to the spray nozzles 9 and 9'.

The third stream is discharged into a thickener 20, the underflow of which contains the recovered yellowcake particles. These particles are centrifuged 22, repulped 23, and recentrifuged 24 by conventional methods prior to thei recombination 25 with the yellowcake slurry being fed into the dryer 2. The overflow 26 of the thickener 20 is decanted 27, and the fluid obtained is reused in the production process. The discharge of the third stream 19 also keeps the concentration of yellowcake particles 4 in the sump 12 to about 4 percent by weight. Although this third stream 19 is shown as a separate line from the condenser sump 12, this line may also be placed as a branch off the recirculation line 17 to the spray nozzles 9 and 9'.

The bleed chamber 16 is used to cleanse the non-condensable gases 28 remaining in the condenser 7 of any residual yellowcake particles 29 as well as to condense any escaped vaporized fluid. This cleansing action is accomplished by drawing these gases with a suction means 30 through the cooled spent spray fluid 8 which is contained in the bleed chamber 16. The gases 28 are introduced into the bleed chamber 16 via a vertical perforated standpipe 31 submersed by the fluid 8. They pass from the interior of the standpipe 31 through the perforations 32 and into the cooled spent spray fluid 8. The suction means 30, preferably a rotary positive displacement blower, continues to draw the cleaned noncondensable gases 33 from the bleed chamber 16 for discharge into a lixiviant tank 34 containing process fluid 35 or other conventional form of waste sump. The cleaned noncondensable gases 33 are vented 36 from the tank 34.

The spent spray fluid 8 is continually cross circulated, preferably by means of a single duo-housing pump 37 between the bleed chamber 16 and the condenser sump 12. The rate of withdrawal of the spent spray fluid 8 is about equal to the rate of discharge of the first stream 15 into the bleed chamber 16. This assures an essentially constant fluid level in the bleed chamber 16. When the process 1 is not operating, the leakage through the duo-housing pump 37 maintains equal levels of fluid 8 in the condenser sump 12 and the bleed chamber 16. The first stream 15 of cooled spent spray fluid 8 is tangentially discharged into the bleed chamber 16 so as to create a vortex 38 of swirling fluid 8 having its center of rotation about the standpipe 31. Also, the fluid 8 being cross-circulated is withdrawn from a position 39 below the entry point of the gases 28 into the fluid 8. This method of discharge and withdrawal ensures that the entering gases 28 are not recirculated back into the condenser sump 12 via the recirculation line 40 while permitting the recovery of the residual yellowcake particles 29 from the bleed chamber 16.

The suction means 30 also draws a slight negative pressure on the condenser 7 and dryer 2 causing a small controlled amount of air infiltration into the dryer 2 and condenser 7. The use of a rotary positive displacement blower is preferred, although other types of blowers or fans capable of generating the suction required may be used.

In a plant employing the process 1, the process fluid used is water and a 50-50 slurry of water and yellowcake is fed into the dryer. The temperature of the off-gases which are a mixture of superheated steam, noncondensable gases and entrained yellowcake particles is at least 300° F., and can range up to 450°, but the preferred temperature is about 392° F. In the condenser 7, the off-gases are cooled and condensed by water having a temperature in the range of 120° F. to 160° F. but preferably about 125° F. Because of its contact with the off-gases 3, the temperature of the spent spray water is increased to the range of 140° to 185° F. or preferably about 145° F. The spent spray water issuing from each of the nozzles 9' impinges upon a specific vertical surface area of the heat transfer panel 10 which is filled with R-11 liquid refrigerant having a temperature in the range of 115° F. to 155° F., preferably about 120° F. The heat absorbed by the water sprayed from the nozzles 9' is transferred through the heat transfer panel 10 vaporizing the R-11 liquid refrigerant which has a boiling point in the range of 115° F. to 155° F., preferably about 120° F. at about 35 PSIA. Accordingly, the temperature of this spent spray water is reduced back to the range of 120° F. to 160° F. or preferably about 125° F. while the surfaces of the panel 10 are kept clean of any buildup of material. The spent spray water which has been cooled is collected in the condenser sump 12 and mixes with the water sprayed from the nozzles 9. The volume of water cooled is sufficient so that, upon mixing with the water from the nozzles 9, the overall temperature of the mixture remains essentially in the range of 140° F. to 155° F., preferably 145° F. The rate at which the cooled spray water is discharged into the thickener 20 is essentially equal to the rate of condensation inside the condenser 7. This prevents emptying or flooding of the condenser 7. A liquid level control subsystem consisting of a liquid level sensor 41 mounted on the sump 12 and a flow control valve 42 mounted in the third stream 19 discharge line may be used to control the discharge rate of the third stream 19 to meet the above goal. In addition, another liquid level control subsystem may be installed on the heat transfer panel 10 and a flow control valve mounted in the return line 14 may be used to ensure that the panel 10 is filled with liquid refrigerant in order to maintain high heat transfer efficiencies.

The noncondensable gases 28 drawn off the condenser 7 have an exit temperature in the range of 300° F. to 450° F., and preferably about 392° F. After passing through the bleed chamber 16 the temperature of these gases is in the range of 235° F. to 275° F., preferably about 240° F.

The flow rates of the gases, the recirculation and cross-circulation rates, the area of heat transfer surface needed, the horsepower and sizing of the pump and blower are dependent upon the size of the plant. For example, in a system processing about 1480 lbs./hr. of yellowcake slurry, about 740 lbs./hr. of off-gases are produced in the dryer and exit at a rate of about 245 SCFM. The flow rate of the noncondensable gases is about 20 SCFM while the air infiltration into the yellowcake dryer caused by the suction in the system is 15 SCFM, an amount considerably less than the 225 SCFM rate of the prior art process. The cross circulation rate to the bleed chamber and the circulation rate to the nozzles is about 5 gpm and 84.5 gpm, respectively, requiring ¼ hp and 7½ hp, respectively. The blower is capable of creating a 24" WG pressure drop and handling 20 SCFM at 240° F. and requires approximately 7½ hp to accomplish this. The blower discharges into a 200,000 gallon lixiviant tank having 20 feet of head. Also, 110 sq. ft. of heat transfer surface is needed to recover the heat in the off-gases. Because of thermal inefficiencies, the heat transfer panel is designed to transfer about 850,500 Btu/h of thermal energy. Approximately 840,000 Btu/h of thermal energy is recoverable with the use of heat exchanging means 300 or 400, while approximately 10 thousand lbs./hr. of yellowcake particles will be recovered for an annual process production rate of 3 million lbs./yr.

Figure 2:
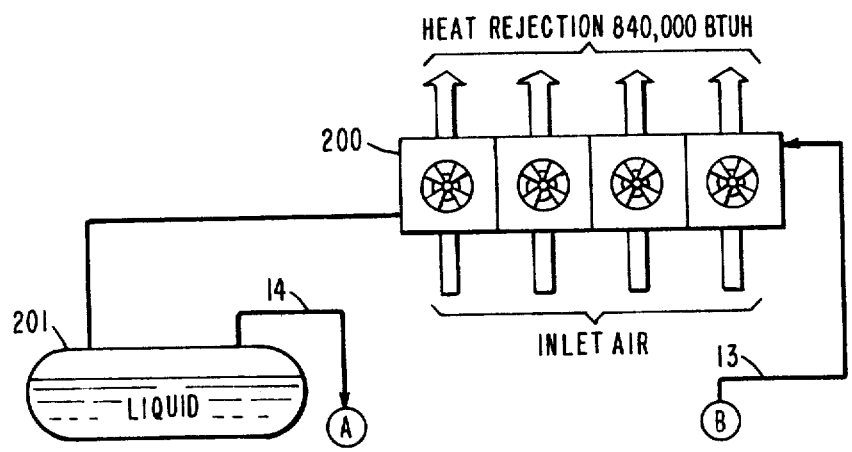
FIGS. 2, 3, and 4 illustrate heat exchanging means of an air-cooled condenser, an air-cooled condenser mounted in a HVAC air handler, and a liquid-cooled condenser, respectively, usable with the recovery system of FIG. 1.
Figure 3:
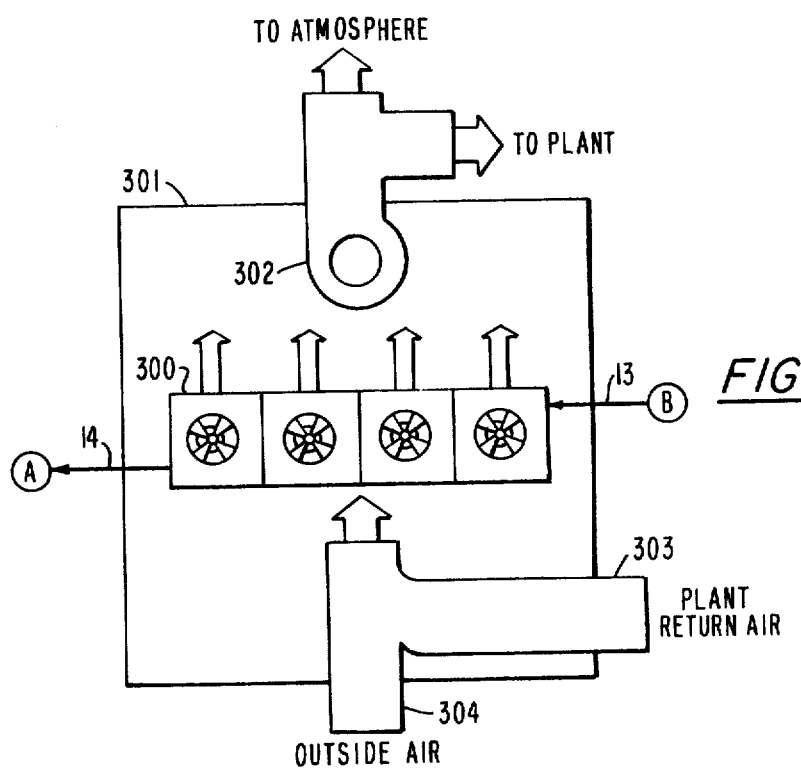
Figure 4:
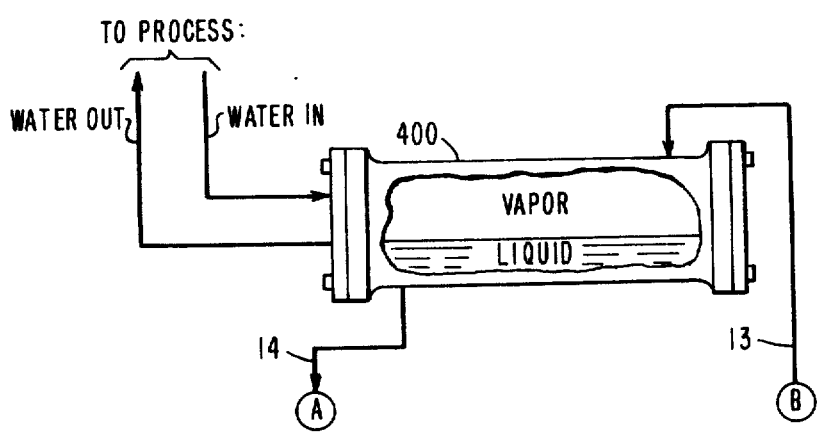

The match points A, B, in the R-11 refrigerant lines 13 and 14 of the heat transfer panel 10 indicate the connection point of the process 1 with the heat exchanging means illustrated in FIGS. 2, 3 and 4. The vaporized R-11 flows through line B into the heat exchanging means 200, 300 or 400, where it is condensed into a liquid having a temperature of about 100° F. The liquid R-11 is circulated via line 14 back to the panel 10.

As shown in FIG. 2, the liquid R-11 is collected in an auxiliary receiver 201 in order to ensure a constant supply of liquid R-11 for the panel 10. The receiver 201 may also be utilized with exchangers 300 and 400. Exchanger means 200 is a conventional air-cooled condenser used soley to reject the recovered process heat into the atmosphere. If the elevation of the heat exchanging means is greater than that of the condenser 7, the effect of gravity may be used to return the liquid R-11 via the return line 14 to the panel 10. Preferably, the elevational difference should be approximately 20 feet. The auxiliary receiver 201, if used, should also be on about the same elevation as the heat exchanging means. Either arrangement ensures that a sufficient fluid head exists to keep the panel 10 filled with liquid R-11.

In FIG. 3 the heat exchanging means 300 is an air-cooled condenser mounted in a HVAC heat recovery unit 301. The heated air exiting the exchanger 300 is drawn into a distributor 302 where it is directed either to the atmosphere or is recirculated to the plant. In the winter, the plant return air 303 may also be combined with the incoming outside air 304, thus reducing the amount of outside air 304 required. Typically, for a plant of the size given in the example, about 40,000 CFM of outside air is used in the summer, whereas only about 4,000 CFM of outside air is necessary in the winter. The heat exchanging means 400 shown in FIG. 4 is a liquid-cooled condenser in which process water is heated by the heat recovered from the vaporized R-11. It should be noted that water may be substituted for R-11 in all of the heat exchanging means and the heat transfer panel but at the expense of larger system components and higher electrical costs.

The forms and features of the particular embodiments of the invention described herein are by way of illustration only and are meant to be in no way restrictive. Numerous changes and modifications may be made and the full use of equivalents resorted to without departing from the spirit or scope of the invention as defined in the following claims.

I claim:

1. In the production of a substantially dry yellowcake product from a slurry composed of yellowcake particles and an evaporable fluid, a process for the recovery of heat, evaporable fluid and yellowcake particles, normally lost in heated off-gases produced by drying of the slurry in a yellowcake dryer comprising:

drawing the off-gases produced in the yellowcake dryer into a condenser, the off-gases consisting of a mixture of condensable gases, noncondensable gases and entrained yellowcake particles;

condensing the off-gases by means of a fluid spray whereby the heat contained in the off-gases is transferred to the spray fluid raising the temperature thereof;

recovering the heat transferred to the spent spray fluid in which the entrained yellowcake particles and condensate are not contained thereby cooling the spent spray fluid;

collecting the cooled spent spray fluid in a condenser sump and separating it into three streams;

discharging the first stream into a fluid containing bleed chamber through which the noncondensable gases and esaped condensable gases remaining in the condenser after condensation of the off-gases are drawn by means of a suction thereby cleaning the noncondensable gases and recovering any residual yellowcake particles entrained therewith and condensing the escaped condensable gases;

continuously cross-circulating the fluid contained in the bleed chamber with the cooled spent spray liquid in the condenser sump;

exhausting the cleaned noncondensable gases;

directing the second stream to the fluid spray; and discharging the third stream into a thickener having a thickened underflow consisting of recovered yellowcake particles, the underflow being recombined with the slurry to be dried, thereby recovering the yellowcake particles contained therein.

2. The process as described in claim 1 wherein drawing the off-gases into the condenser is further defined as comprising:

thermally isolating the condenser from the dryer by vertically drawing the heated off-gases from the dryer through a duct positioned thereover, and then horizontally and transversely through a plurality of baffles into the condenser thereby preventing the condensation of the off-gases prior to entry into the condensers and return of the condensate by gravity to the dryer.

3. The process as described in claim 1 wherein the steps of condensing the off-gases and recovering the heat therein is further defined as comprising:

spraying the fluid through a plurality of nozzles into the off-gases as they enter the condenser and onto a surface of a vertically positioned heat transfer panel located therein, the panel containing a vaporizable cooling fluid; and further positioning each nozzle to spray on a specific vertical surface area of the panel so that the heat transferred from the condensed gaseous mixture to the spent fluid spray is transferred from the spent fluid spray through the panel and into the cooling fluid contained therein as it flows over the surface thereof, thereby cooling the spent fluid spray and vaporizing the cooling fluid.

4. The process as described in claim 3 wherein vaporizing the cooling fluid is further defined as comprising:
continually drawing the vaporized cooled fluid into a heat exchange means in which the vapor is cooled and recondensed and the heat contained in the vapor is recovered; and
continually returning the liquid cooling fluid to the heat transfer panel.

5. The process as described in claim 4 wherein the cooling fluid is chosen from a group consisting of R-11 refrigerant or water.

6. The process as described in claim 4 wherein the conventional heat exchange means is an air-cooled condenser coil mounted in an HVAC air handler thereby recovering the heat for general heating purposes.

7. The process as described in claim 4 wherein the heat recovered from the cooling fluid in the heat exchange means is released to ambient air.

8. The process as described in claim 4 wherein the conventional heat exchange means is a water-cooled condenser coil thereby recovering the heat for general fluid heating purposes.

9. The process as defined in claim 1 wherein the cleaning and exhausting of the noncondensable gases is further defined as comprising:
discharging the first stream of cooled spent spray fluid tangentially into the bleed chamber thereby creating a vortex of swirling cooled spent spray fluid about a standpipe located therein;
drawing, by suction means, the noncondensable gases and escaped condensable gases from the condenser into the bleed chamber and through the cooled spent spray fluid by way of the standpipe having a multiplicity of perforations located about its periphery so that the noncondensable gases entering the bleed chamber are kept about the center of the vortex of swirling fluid while being drawn therethrough, thereby preventing the noncondensable gases from being recirculated into the condenser while recovering any residual yellowcake particles entrained therewith and condensing the escaped vaporized fluid;

continuously cross-circulating the swirling fluid contained in the bleed chamber with the cooled spent spray fluid in the condenser sump by withdrawing the swirling fluid from a position below the point at which the gases enter the fluid at a rate equal to that of the cooled spent spray fluid being discharged into the bleed chamber so that the fluid level in the bleed chamber remains essentially constant; and exhausting the cleaned noncondensable gases from the bleed chamber.

10. The process as described in claim 9 wherein exhausting the cleaned noncondensable gases from the bleed chamber further comprises:

directing said cleaned noncondensable gases into a lixiviant tank containing process fluid so that any minute fraction of yellowcake particles escaping the bleed chamber will be trapped therein; and venting the cleaned noncondensable gases from the lixiviant tank into the atmosphere.

11. In the production of a substantially dry yellowcake product from a slurry composed of yellowcake particles and water, a process for the recovery of heat, water and yellowcake particles, normally lost in heated off-gases produced by drying of the slurry in a yellowcake dryer, comprising:

drawing the off-gases produced in the yellowcake dryer vertically through a duct positioned thereover and then horizontally and transversely through a plurality of baffles into a condenser, the off-gases consisting of a mixture of infiltrated air, superheated steam, noncondensable gases and entrained yellowcake particles, the off-gases having a temperature of at least 300° F., thereby preventing condensation of the off-gases prior to their entry into the condenser and the return of condensate by gravity to the dryer;

spraying water having a sensible heat of about 125° F. onto the off-gases as they enter the condenser and onto a surface of vertically positioned, R-11 liquid refrigerant filled, heat transfer panel, thereby increasing the sensible heat of the spent spray water to about 145° F. and condensing the steam;

further positioning a nozzle to spray onto a specific surface area of the panel so that the increased sensible heat of the spent spray water is transferred through heat transfer panel vaporizing the R-11 thereby reducing the sensible heat of the spent spray water to about 125° F.;

discharging the vaporized R-11 from the panel;

collecting the cooled spent spray fluid containing the condensed steam and entrained yellowcake particles in a sump of the condenser and separating it into three streams;

discharging the first stream tangentially into a bleed chamber thereby creating a vortex of swirling cooled spent spray water about a standpipe located therein;

drawing, by the suction means, the noncondensable gases and escaped steam from the condenser into the bleed chamber and through the swirling spent spray water via the standpipe having a multiplicity of perforations located about its periphery and being positioned so that the noncondensable gases entering the bleed chamber are kept about the center of the vortex of the swirling spent spray water while being drawn therethrough, thereby preventing the noncondensable gases from being recirculated into the condenser while recovering any residual yellowcake particles entrained therewith and condensing the escaped steam;

continuously cross-circulating the water in the bleed chamber and condenser sump by withdrawing water and residual yellowcake particles from below the point at which the off-gases are introduced into the bleed chamber from the interior of the standpipe at a rate equal to that of the water being discharged into the bleed chamber so that the fluid level in the bleed chamber remains essentially constant;

exhausting the cleaned noncondensable gases having a temperature of about 240° F. from the bleed chamber into a lixiviant tank having a fluid head of about 20 feet of process water so that any minute fraction of yellowcake particles escaping the bleed chamber will be trapped therein;

venting into the atmosphere the cleaned noncondensable gases contained in the lixiviant tank;

directing the second stream to the spray nozzles; and discharging the third stream into a thickener having a thickened underflow containing the yellowcake particles, the underflow being recombined with the slurry to be dried, thereby recovering the yellowcake particles contained therein.

12. The process as described in claim 11 wherein discharging the vaporized R-11 further comprises:

continually drawing the vaporized R-11 into a heat exchanging means in which the R-11 is cooled and recondensed into a liquid having a temperature of about 100° F. and its heat recovered for general heating purposes; and recirculating the liquid R-11 back into the heat transfer panel.

13. The process as described in claim 11 wherein the rate of discharge of the third stream is essentially equal to the rate of condensation of the steam.

14. The process as described in claim 13 wherein the rate of condensation of the steam is about 1.5 gpm.

15. The process as described in claim 11 wherein the rate of condenser sump water directed to the sprays is about 84.5 gpm.

16. The process as described in claim 11 wherein the rate of discharge of spent spray water into the bleed chamber is essentially equal to the rate of withdrawal of said water.

17. The process as described in claim 16 wherein the rate of discharge of spent spray water into the bleed chamber is about 5 gpm.

18. The process as described in claim 11 wherein the concentration of yellowcake particles contained in the spent spray water is about 4% by weight.

19. An apparatus for the recovery of heat, water and yellowcake particles, normally lost in heated off-gases produced by drying of yellowcake slurry in a yellowcake dryer, comprising:

a condenser having a sump;

a vertically positioned liquid refrigerant filled heat transfer panel and a plurality of spray nozzles located in the condenser with some of the nozzles positioned to spray water so as to impinge upon specific vertical surfaces of the heat transfer panel;

a means for directing the off-gases from the dryer into the condenser so that the off-gases comprising a mixture of noncondensable gases, steam and entrained yellowcake particles will be contacted by the sprayed water, the sprayed water condensing the steam and removing the entrained yellowcake particles from the off-gases and the heat absorbed by the sprayed water impinging upon the heat transfer panel being transferred therethrough vaporizing the liquid refrigerant therein, and thereby cooling the water;

heat exchange means for removing the heat transferred into the heat transfer panel and returning cooled liquid refrigerant thereto;

a means for cross-circulating a first stream of cooled spent spray water between the sump and a bleed chamber;

a means for drawing off-gases from the dryer through the condenser and bleed chamber for further cleaning the noncondensable off-gases of residual yellowcake particles and condensation of escaped steam in the cross-circulating water;

a means for circulating a second stream of the cooled spent spray water to the spray nozzles;

a means for withdrawing a third stream of cooled spent spray water from the sump;

a means for recovering and recombining yellowcake particles contained in the third stream with the yellowcake slurry being fed into the dryer; and a means to recover the water contained in the third stream for use in the production process.

20. The apparatus as described in claim 19 wherein the means for drawing the off-gases into the condenser through the condenser and bleed chamber includes a rotary positive displacement pump.

21. The apparatus as described in claim 19 wherein the means for directing the off-gases from the dryer into the condenser is further defined as comprising:

a duct having a lower vertical portion and an upper horizontal portion with the upper horizontal portion attached to the condenser and the lower vertical portion positioned over the yellowcake dryer; the interior of the duct being in communication with the interior of the condenser and having a plurality of baffles located in the horizontal portion thereof whereby the off-gases are drawn into the lower portion of the duct and upwardly therethrough and then horizontally and transversely through the baffles into the condenser for condensation therein, the baffles thermally isolating the condenser from the duct to prevent condensation of the steam therein.

22. The apparatus as described in claim 19 wherein the liquid refrigerant is R-11 liquid refrigerant.

23. The apparatus as defined in claim 19 wherein the means used to cross-circulate water between the condenser sump and bleed chamber includes a duo-housing pump.

24. The apparatus as described in claim 19 wherein the means for withdrawal of the third stream comprises a liquid level control subsystem consisting of a liquid level sensor mounted on the condenser sump and a flow control valve mounted in the third stream whereby the level sensor controls the opening of the control valve so that the rate of discharge of the third stream is approximately equal to the rate of steam condensation in the condenser.

25. The apparatus as defined in claim 19 wherein the bleed chamber is further defined as comprising:

a vertical, perforated standpipe located at the center thereof, the interior of said standpipe being in communication with the interior of the condenser, said off-gases being drawn through said standpipe and perforations into the cross-circulating cooled spray water, the standpipe being submersed in the cross-circulating cooled spray water.

26. The apparatus as defined in claim 25 wherein the bleed chamber further comprises:

an inlet for the tangential discharge of the cross-circulating water into the bleed chamber so as to create a swirling vortex about the standpipe; and an outlet for the removal of the cross-circulating water from the bleed chamber for return to the sump, the outlet being positioned below the inlet and below the point at which the off-gases are introduced into the bleed chamber from the interior of the standpipe thereby preventing the recirculation of the off-gases to the condenser sump.

27. The apparatus as defined in claim 19 wherein is included a lixiviant tank having a vent to atmosphere and containing process water having a head of about 20 feet, the interior of the tank being in communication with the interior of the bleed chamber whereby cleaned noncondensable gases are drawn from the bleed chamber into the tank for venting to the atmosphere.

28. The apparatus as defined in claim 19 wherein the means for recovering and recombining the yellowcake particles in the third stream with the yellowcake slurry further comprises:
 a thickener;
 a first centrifuge to receive an underflow containing yellowcake particles from the thickener;
 a repulp device in series with the first centrifuge;
 a second centrifuge in series with the repulp device whereby the underflow containing the yellowcake particles is thickened and dewatered prior to its recombination with the slurry feed.

29. The apparatus as defined in claim 28 wherein the means to recover water from the third stream includes a decanting device for receiving an overflow from the thickener thereby recovering the water for reuse in the process.

30. The apparatus as described in claim 19 wherein is included a liquid level control subsystem comprising a float valve mounted in a liquid refrigerant return line from the heat exchange means and a liquid level switch mounted on the heat transfer panel with the level switch sensing the refrigerant level in the panel and operating the valve to maintain the desired level of liquid refrigerant in the panel.

31. The apparatus as defined in claim 19 wherein the heat exchange means is positioned about 20 feet above the condenser so that cooled liquid refrigerant will flow by gravity back into the heat transfer panel.

32. The apparatus as described in claim 31 wherein an auxiliary tank is placed intermediate the heat exchange means and the condenser at an elevation of about 20 feet, the tank being in communication with both the condenser and heat exchange means and containing liquid refrigerant, so that a fluid head exists to keep the heat transfer panel filled with liquid refrigerant received from the auxiliary tank.

33. The apparatus as described in claim 19 wherein the heat exchange means includes an air-cooled condenser.

34. The apparatus as described in claim 33 wherein the heat exchange means includes a condenser mounted in a HVAC heat recovery unit.

35. The apparatus as described in claim 19 wherein the heat exchange means includes a liquid-cooled condenser.

36. The apparatus as described in claim 19 wherein the liquid refrigerant includes R-11 liquid refrigerant.

* * * * *